US012699596B2

(12) United States Patent
Khosrowpour et al.

(10) Patent No.: US 12,699,596 B2
(45) Date of Patent: Aug. 4, 2026

(54) MANAGING COMPUTING WORKLOADS AT AN INFORMATION HANDLING SYSTEM

(71) Applicant: Dell Products L.P., Round Rock, TX (US)

(72) Inventors: Farzad Khosrowpour, Pflugerville, TX (US); Suraj M Varma, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 634 days.

(21) Appl. No.: 18/300,590

(22) Filed: Apr. 14, 2023

(65) Prior Publication Data

US 2024/0345876 A1 Oct. 17, 2024

(51) Int. Cl.
| | |
|---|---|
| *G06F 9/50* | (2006.01) |
| *G06F 1/3203* | (2019.01) |
| *G06F 1/3234* | (2019.01) |
| *G06F 9/48* | (2006.01) |
| *G06F 18/241* | (2023.01) |

(52) U.S. Cl.
CPC ............ G06F 9/505 (2013.01); G06F 1/3203 (2013.01); G06F 1/3234 (2013.01); G06F 9/4893 (2013.01); G06F 9/5027 (2013.01); G06F 9/5044 (2013.01); G06F 9/5094 (2013.01); G06F 18/241 (2023.01)

(58) Field of Classification Search
None
See application file for complete search history.

(56) References Cited

U.S. PATENT DOCUMENTS

| | | | |
|---|---|---|---|
| 10,771,580 B1 * | 9/2020 | Khosrowpour | ......... G06F 9/505 |
| 10,904,488 B1 * | 1/2021 | Weisz | .................. G06V 10/774 |
| 2023/0127216 A1 * | 4/2023 | He | ..................... H05K 7/20836 |
| | | | 700/300 |

* cited by examiner

*Primary Examiner* — Qing Yuan Wu
(74) *Attorney, Agent, or Firm* — McDermott Will & Schulte LLP

(57) ABSTRACT

Managing computing workloads at an information handling system (IHS), including performing, at a first time, a calibration and configuration of a computing workload management model, including: identifying characteristics of a workload executing at the IHS; performing, based on the characteristics, a classification of the workload executing at the IHS; training, based on the classification of the workload, the computing workload management model, including generating a configuration policy including configuration rules, the configuration rules for automatically adjusting parameters of the IHS; performing, at a second time, a steady-state management of the computing workloads at the IHS, including: monitoring execution of an additional workload at the IHS; in response to execution of the additional workload, i) accessing the computing workload management model including the configuration policy, ii) identifying configuration rules based on the monitored execution of the additional computing workload, iii) applying the configuration rules to automatically adjust parameters of the IHS.

16 Claims, 5 Drawing Sheets

MANAGING COMPUTING WORKLOADS AT AN INFORMATION HANDLING SYSTEM

BACKGROUND

Field of the Disclosure

The disclosure relates generally to an information handling system, and in particular, managing computing workloads at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing computing workloads at an information handling system, comprising performing, at a first time, a calibration and configuration of a computing workload management model, including: identifying one or more characteristics of a workload executing at the information handling system; performing, based on the characteristics, a classification of the workload executing at the information handling system; training, based on the classification of the workload, the computing workload management model, including generating a configuration policy including configuration rules, the configuration rules for automatically adjusting one or more parameters of the information handling system; performing, at a second time, a steady-state management of the computing workloads at the information handling system, including: monitoring execution of an additional workload at the information handling system; in response to execution of the additional workload at the information handling system, i) accessing the computing workload management model including the configuration policy, ii) identifying one or more of the configuration rules based on the monitored execution of the additional computing workload, and iii) applying the one or more configuration rules to automatically adjust one or more parameters of the information handling system.

Other embodiments of these aspects include corresponding systems, apparatus, and computer programs, configured to perform the actions of the methods, encoded on computer storage devices.

These and other embodiments may each optionally include one or more of the following features. For instance, adjusting the one or more parameters of the information handling system further includes adjusting the one or more parameters of the information handling system such that an acoustic noise of the information handling system is reduced. Adjusting the one or more parameters of the information handling system further includes adjusting the one or more parameters of the information handling system such that a processing capability of the information handling system is increased. Monitoring the execution of the additional workload further includes: identifying one or more characteristics of the additional workload executing at the information handling system; and performing, based on the characteristics, a classification of the additional workload executing at the information handling system, wherein the one or more of the configuration rules are identified based on the classification of the additional workload. Performing the calibration and configuration of the computing workload management model further includes: identifying audio characteristics of the audio workload executing at the information handling system; performing, based on the audio characteristics, the classification of the audio workload as recording of an audio stream; and training, based on recording of the audio stream classification of the audio workload, the computing workload management model, including generating the configuration policy to include configuration rules for automatically reducing a speed of a fan of the information handling system and reducing a processing capability of the information handling system. Performing the classification of the workload further includes classification of the workload as recording of the audio stream. Performing the classification of the workload further includes classification of the workload as an incoming audio stream of a collaboration workload. The collaboration workload is a video-teleconferencing workload. Performing the calibration and configuration of the computing workload management model further includes: identifying audio characteristics of the audio workload executing at the information handling system; performing, based on the audio characteristics, the classification of the audio workload as processing of an audio stream; and training, based on processing of the audio stream classification of the audio workload, the computing workload management model, including generating the configuration policy to include configuration rules for automatically increasing a speed of a fan of the information handling system and increasing a processing capability of the information handling system. The one or more parameters includes one or more of a central processing unit (CPU) frequency, a graphical processing unit (GPU) frequency, background application throttling, dynamic user-selectable thermal tables, processor power management core parking, and thermal control circuit offset.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
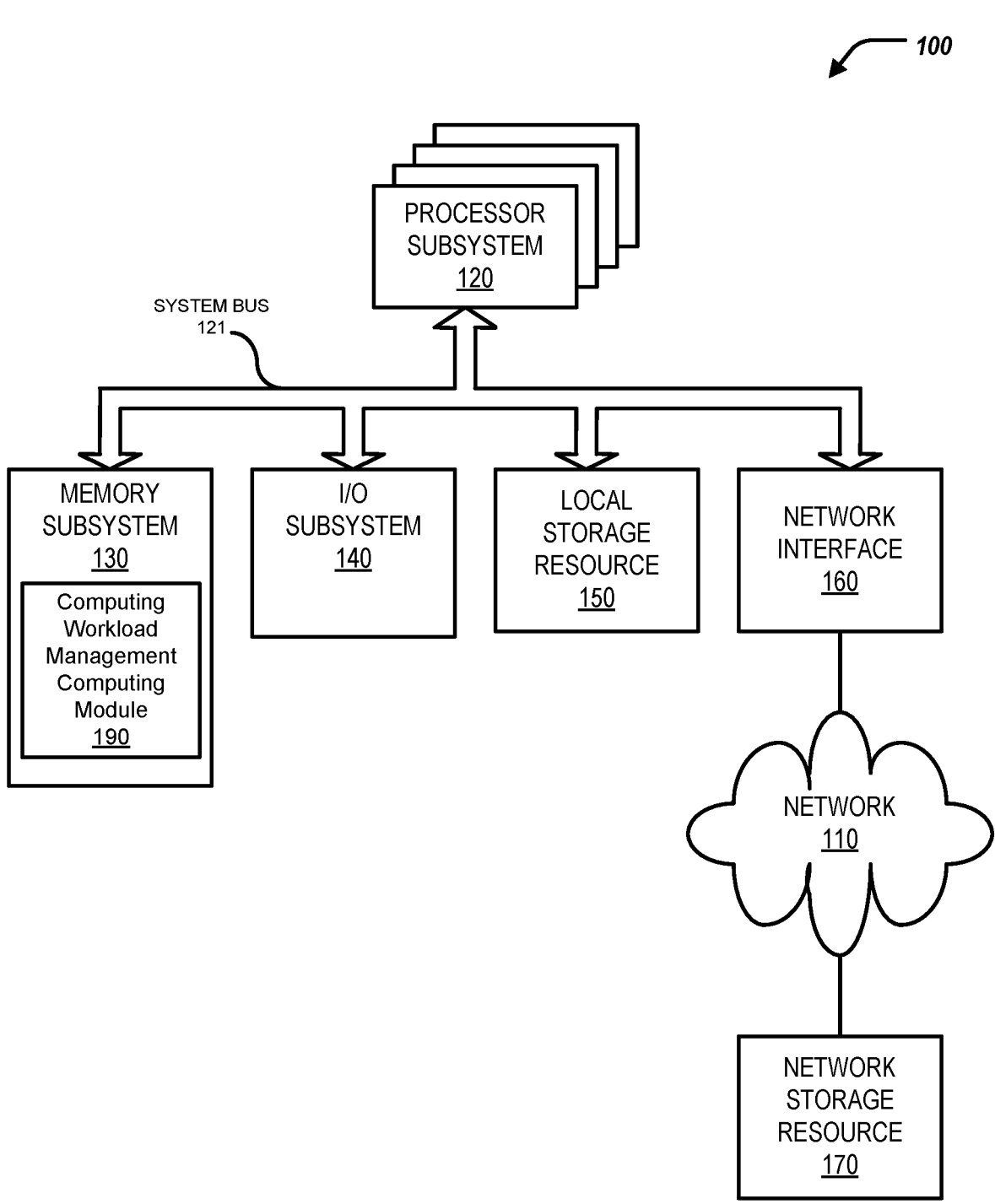
FIG. 1 is a block diagram of selected elements of an embodiment of an information handling system.

This disclosure discusses methods and systems for managing computing workloads of an information handling system. In short, runtime workload classification can be leveraged to dynamically determine optimal operating conditions of an information handling system. Different modes of workloads can be detected and resource demands adjusted at the information handling system.

Specifically, this disclosure discusses a system and a method for managing computing workloads at an information handling system, including performing, at a first time, a calibration and configuration of a computing workload management model, including: identifying one or more characteristics of a workload executing at the information handling system; performing, based on the characteristics, a classification of the workload executing at the information handling system; training, based on the classification of the workload, the computing workload management model, including generating a configuration policy including configuration rules, the configuration rules for automatically adjusting one or more performance parameters of the information handling system; performing, at a second time, a steady-state management of the computing workloads at the information handling system, including: monitoring execution of an additional workload at the information handling system; in response to execution of the additional workload at the information handling system, i) accessing the computing workload management model including the configuration policy, ii) identifying one or more of the configuration rules based on the monitored execution of the additional computing workload, and iii) applying the one or more configuration rules to automatically adjust one or more performance parameters of the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (ISCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a computing workload management computing module 190. The computing workload management computing module 190 can be included by the memory subsystem 130. The computing workload management computing module 190 can include a computer-executable program (software). The computing workload management computing module 190 can be executed by the processor subsystem 120.

In short, the computing workload management computing module 190 can leverage runtime workload classification and dynamically determine optimal operating conditions of the information handling system 100. The computing workload management computing module 190 can adjust system settings by detecting different modes of workloads and adjusting resource demands at the information handling system 100.

Figure 2:
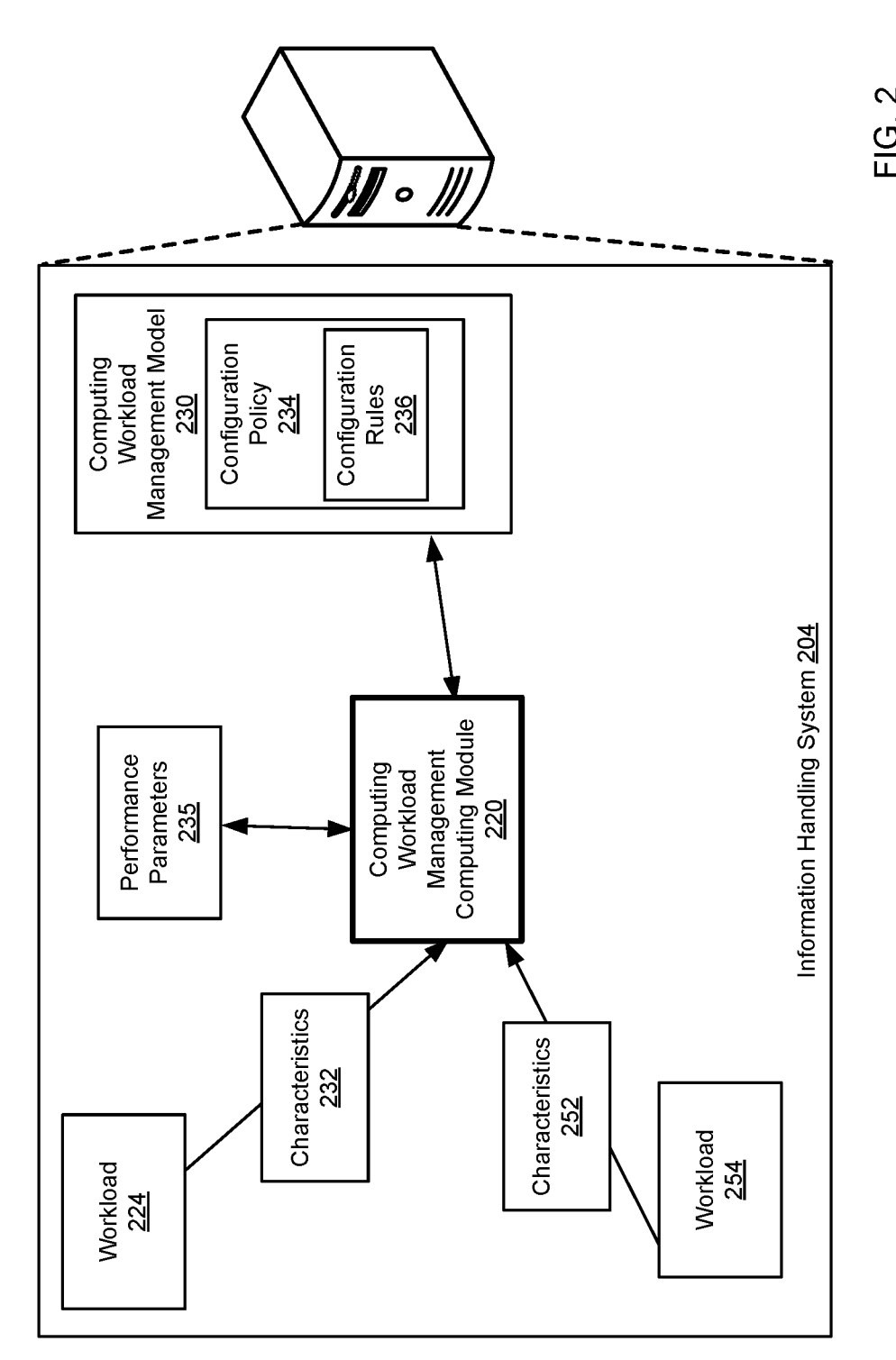
FIGS. 2, 3 illustrate respective block diagrams of an information handling system for managing computing workloads.

Turning to FIG. 2, FIG. 2 illustrates an environment 200 including an information handling system 204. The information handling system 204 can include a computing workload management computing module 220. In some examples, the information handling system 204 is similar to, or includes, the information handling system 100 of FIG. 1. In some examples, the computing workload management computing module 220 is the same, or substantially the same, as the computing workload management computing module 190 of FIG. 1.

In some embodiments, the computing workload management computing module 220 can perform, at a first time, a calibration and configuration of a computing workload management model 230. Specifically, performing the calibration and the configuration of the computing workload management model 230 can include identifying one or more characteristics 232 of a workload 224 executed at the information handling system 204. In some examples, the characteristics 232 of the workload 224 can include a type of the workload 224—audio-based workload, video-based workload, or other. In some examples, the characteristics 232 of the workload 224 can include processing computational resources required by the workload 224. In some examples, the characteristics 232 can include system inputs/outputs accessed by the workload 224. In some examples, the characteristics 232 can include resource requirements of the workload 224 with respect to the information handling system 204 and computing components of the information handling system 204 (e.g., the processor subsystem 120, the memory subsystem 130, the I/O subsystem 140, the local storage resource 150, and the network interface 160).

In some examples, the characteristics 232 of the workload 224 can include a mode of the workload 224. For example, the mode of the workload 224 can include a performance mode of the workload 224. For example, the mode can include an energy performance optimizer (EPO) mode of the workload 224. For example, the mode can include a user-selectable thermal tables (USTT) mode of the workload 224.

In some examples, the computing workload management computing module 220 can perform, based on the characteristics 232 of the workload 224, a classification of the workload 224 executing at the information handling system 204. The computing workload management computing module 220 can place the workload 224 into a class of workloads based on the characteristics 232 of the workload 224, where the class indicates shared characteristics among workloads. For example, the computing workload management computing module 220 can classify the workload 224 based on, one or more of and among other characteristics, a type of the workload 224, processing computing resources required by the workload 224, system inputs/outputs accessed by the workload 224, resource requirements of the workload 224, the mode of the workload 224, among other characteristics. The computing workload management computing module 220 can store data indicating such classification of the workload 224 in a data store (not shown).

The computing workload management computing module 220 can perform the calibration and configuration of the computing workload management model 230 for multiple workloads 224, at the first time.

The computing workload management computing module 220 can train, based on the classification of the workload 224, the computing workload management model 230. Specifically, the computing workload management computing module 220 can generate, based on the classification of the workload 224, a configuration policy 234 that includes configuration rules 236. In some examples, the configuration rules 236 are rules for performing computer-implemented actions for automatically adjusting one or more parameters 235 of the information handling system 204.

To that end, the computing workload management computing module 220 can train the computing workload management model 230 to establish connections between the classification of the workload and the configuration rules 236. Specifically, the computing workload management model 230 can identify one or more configurations rules 236 to be applied based on a connection with the classification of the workload 224. In other words, the computing workload management computing module 220 can train the computing workload management model 230 to establish connections between the characteristics 232 and the configuration rules 236. Specifically, the computing workload management model 230 can identify one or more configurations rules 236 to be applied based on a connection with one or more of the characteristics 232 of the workload 224.

In some examples, the computing workload management computing module 220 can train the computing workload management model 230 using a machine learning process, and/or a neural network. For example, the computing workload management computing module 220 can identify the characteristics 232 over a first time period. The computing workload management computing module 220 can identify the characteristics 232 in response, or based on, execution (or prior to execution) of the workload 224 at the information handling system 204. That is, the computing workload management computing module 220 can identify the characteristics 232 of the information handling systems 204 in response to execution of the workload 224 at the information handling system 204, or prior to execution of the workload 224 at the information handling system 204. The computing workload management computing module 220 can then train the computing workload management model 230 based on the characteristics 232, the classification of the workload 224 based on such characteristics 232, and the execution (or prior to execution) of the workload 224 (e.g., using a machine learning process, and/or a neural network).

In some examples, the configuration rules 236 can include rules for automatically adjusting one or more of the parameters 235 of the information handling system 204. The parameters 235 can include performance parameters, power parameters, acoustic parameters, and/or power efficiency parameters of the information handling system 204. For examples, the parameters 235 can include a central processing unit (CPU) frequency, a graphical processing unit (GPU) frequency, background application throttling, dynamic user-selectable thermal tables, processor power management core parking, and CPU thermal controls. That is, the configuration rules 236 can include rules for automatically adjusting the CPU frequency, the GPU frequency, the background application throttling, the dynamic user-selectable thermal tables, the processor power management core parking, and the CPU thermal controls.

In some examples, the parameters 235 can include a dynamic EPO (energy performance optimizer) at runtime through a software OEM (original equipment manufacturer) variable. In some examples, the parameters 235 can include a CPU and a GPU clock control for performance management through Intel® Innovation Platform Framework (IPF). In some examples, the parameters 235 can include a dynamic user-selectable thermal tables (USTT). In some examples, the parameters 235 include dynamic control of background application resources. In some examples, the parameters 235 include resource de-prioritization of background tasks. In some examples, the parameters 235 include CPU thermal controls. In some examples, the parameters 235 include CPU hot plugging.

The computing workload management computing module 220 can perform, at a second time, the steady-state management of the computing workloads at the information handling system 204. For example, the computing workload management computing module 220 monitors execution of an additional workload 254 at the information handling system 204. In some examples, monitoring the execution of the additional workload 254 can include identifying one or more characteristics 252 of the additional workload 254 executed at the information handling system 204, similar to that mentioned with identifying the characteristic 232 of the workload 224. For example, the characteristics 252 of the additional workload 254 can include a type of the additional workload 254—audio-based workload, video-based workload, or other. In some examples, the characteristics 252 of the additional workload 254 can include processing computational resources required by the additional workload 254. In some examples, the characteristics 252 can include system inputs/outputs accessed by the additional workload 254. In some examples, the characteristics 252 can include resource requirements of the additional workload 254 with respect to the information handling system 204 and computing components of the information handling system 204 (e.g., the processor subsystem 120, the memory subsystem 130, the I/O subsystem 140, the local storage resource 150, and the network interface 160).

In some examples, the characteristics 252 of the additional workload 254 can include a mode of the additional workload 254. For example, the mode of the additional workload 254 can include a performance mode of the additional workload 254. For example, the mode can include an energy performance optimizer (EPO) mode of the additional workload 254. For example, the mode can include a user-selectable thermal tables (USTT) mode of the additional workload 254.

In some examples, the computing workload management computing module 220 can perform, based on the characteristics 252 of the additional workload 254, a classification of the additional workload 254 executing at the information handling system 204, similar to the classification of the workload 224. For example, the computing workload management computing module 220 can place the additional workload 254 into a class of workloads based on the characteristics 252 of the additional workload 254. For example, the computing workload management computing module 220 can classify the additional workload 254 based on, one or more of and among other characteristics, a type of the additional workload 254, processing computing resources required by the additional workload 254, system inputs/outputs accessed by the additional workload 254, resource requirements of the additional workload 254, the mode of the additional workload 254, among other characteristics.

The computing workload management computing module 220, in response to execution of the additional workload 254 at the information handling system 204, can access the computing workload management model 230 including the configuration policy 234. The computing workload management computing module 220 can further identify one or more of the configuration rules 236 based on the monitored execution of the additional workload 254. Furthermore, the computing workload management computing module 220 can apply the identified configuration rules 236 to the information handling system 204. In other words, the computing workload management computing module 220 can apply appropriate configuration rules 234 based on the monitored execution of the additional workload 254 as provided by the computing workload management model 230. In some examples, the computing workload management computing module 220 can apply the configuration rules 234 to perform computer-implemented actions to adjust one or more of the parameters 235.

In some examples, the computing workload management computing module 208 can perform the steady-state management of the computing workloads at the information handling system 204 iteratively.

In some examples, the computing workload management computing module 220, in response to execution of the additional workload 254 at the information handling system 204, can access the computing workload management model 230 including the configuration policy 234. The computing workload management computing module 220 can further identify one or more of the configuration rules 236 based on the classification of the additional workload 254. Furthermore, the computing workload management computing module 220 can apply the configuration rules 236 to the information handling system 204. In other words, the computing workload management computing module 220 can apply appropriate configuration rules 234 based on the classification of the additional workload 254 as provided by the computing workload management model 230. In some examples, the computing workload management computing module 220 can apply the configuration rules 236 to perform computer-implemented actions to adjust one or more of the parameters 235.

For example, the computing workload management computing module 220 can apply the configuration rules 236 to adjust one or more of the parameters 235 of the information handling system 204. For example, the computing workload management computing module 220 can apply the configuration rules 236 to adjust performance parameters, power parameters, acoustic parameters, and/or power efficiency parameters of the information handling system 204. For example, the computing workload management computing module 220 can apply the configuration rules 236 to adjust one or more of the CPU frequency, the GPU frequency, the background application throttling, the dynamic user-selectable thermal tables, the processor power management core parking, and the time coordinated computing offset. That is, the configuration rules 236 can include rules for automatically adjusting the CPU frequency, the GPU frequency, the background application throttling, the dynamic user-selectable thermal tables, the processor power management core parking, and the time coordinated computing offset.

For example, the computing workload management computing module 220 can apply the configuration rules 236 to adjust one or more of the parameters 235 such that an acoustic noise generated by one or more components of the information handling system 204 is reduced.

For example, the computing workload management computing module 220 can apply the configuration rules 236 to adjust one or more of the parameters 235 such that a processing capability of the information handling system 204 is increased. For example, the processing capability can include operations per second performed by the information handling system 204 (the processor subsystem 120), a data store rate of the information handling system 204 (local storage resource 150), or other operations performed by the information handling system 204.

Figure 3:
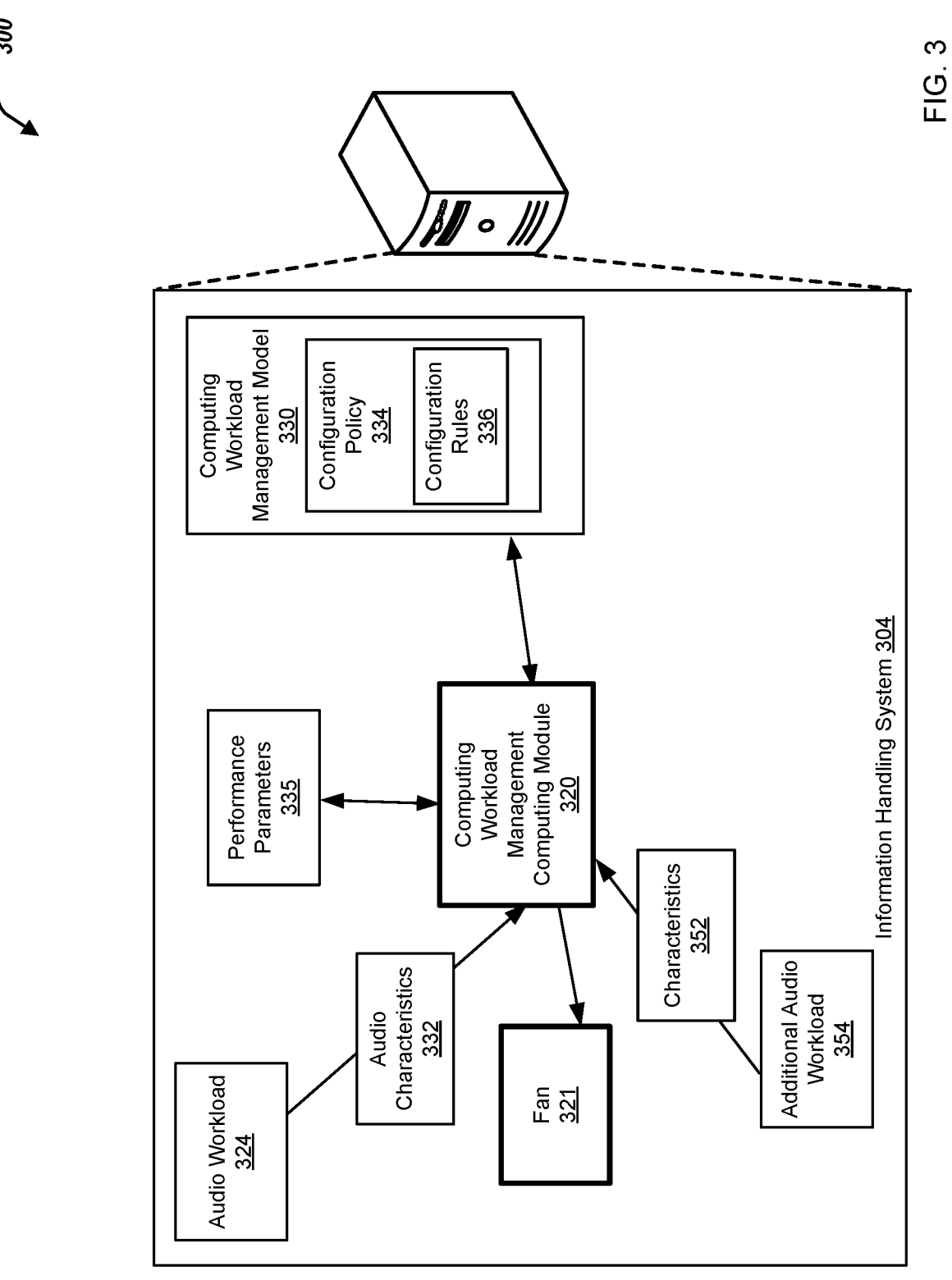

Turning to FIG. 3, FIG. 3 illustrates an environment 300 including an information handling system 304. The information handling system 304 can include a computing workload management computing module 320 and a fan 321. In some examples, the information handling system 304 is similar to, or includes, the information handling system 100 of FIG. 1. In some examples, the computing workload management computing module 320 is the same, or substantially the same, as the computing workload management computing module 190 of FIG. 1.

In some embodiments, the computing workload management computing module 320 can perform, at a first time, a calibration and configuration of a computing workload management model 330. Specifically, performing the calibration and the configuration of the computing workload management model 330 can include identifying one or more audio characteristics 332 of an audio workload 324 executed at the information handling system 304. In some examples, the audio characteristics 332 of the audio workload 324 can include a type of the audio workload 324—audio-recording, audio-streaming, or other audio-based workloads. In some examples, the audio characteristics 332 of the audio workload 324 can include processing computational resources required by the audio workload 324. In some examples, the audio characteristics 332 can include system inputs/outputs accessed by the audio workload 324—for example, a microphone or a speaker. In some examples, the audio characteristics 332 can include resource requirements of the audio workload 324 with respect to the information handling system 304 and computing components of the information handling system 304 (e.g., the processor subsystem 120, the memory subsystem 130, the I/O subsystem 140, the local storage resource 150, and the network interface 160).

In some examples, the computing workload management computing module 320 can perform, based on the audio characteristics 332 of the audio workload 324, a classification of the audio workload 324 executing at the information handling system 304. The computing workload management computing module 320 can place the audio workload 324 into a class of audio workloads based on the audio characteristics 332 of the audio workload 324, where the class indicates shared audio characteristics among audio workloads. For example, the computing workload management computing module 320 can classify the audio workload 324 based on, one or more of and among other characteristics, a type of the audio workload 324, processing computing resources required by the audio workload 324, system inputs/outputs accessed by the audio workload 324, resource requirements of the audio workload 324, among other characteristics. The computing workload management computing module 320 can store data indicating such classification of the audio workload 324 in a data store (not shown).

In some examples, the computing workload management computing module 320 can perform classification of the audio workload 324, based on the characteristics 332 of the workload 224, as an audio stream.

In some examples, the computing workload management computing module 320 can perform classification of the audio workload 324, based on the characteristics 332 of the workload 324, as recording of an audio stream.

In some examples, the computing workload management computing module 320 can perform classification of the audio workload 324, based on the characteristics 332 of the workload 324, as processing of an audio stream.

In some examples, the computing workload management computing module 320 can perform, based on the audio characteristics 332 of the audio workload 324, a classification of the audio workload 324 executing at the information handling system 304 as a recording of an audio stream. For example, the audio workload 324 could be a recording of an audio stream of a video-teleconferencing session, or a conference call.

In some examples, the computing workload management computing module 320 can perform, based on the audio characteristics 332 of the audio workload 324, a classification of the audio workload 324 executing at the information handling system 304 as a recording of an incoming audio stream of a collaboration workload. For example, the audio workload 324 could be a recording of an audio stream of a video-teleconferencing session, or a conference call.

The computing workload management computing module 320 can perform the calibration and configuration of the computing workload management model 330 for multiple audio workloads 324, at the first time.

The computing workload management computing module 320 can train, based on the classification of the audio workload 324, the computing workload management model 330. Specifically, the computing workload management computing module 320 can generate, based on the classification of the audio workload 324, a configuration policy 334 that includes configuration rules 336. In some examples, the configuration rules 336 are rules for performing computer-implemented actions for automatically adjusting one or more parameters 335 of the information handling system 304.

To that end, the computing workload management computing module 320 can train the computing workload management model 330 to establish connections between the classification of the audio workload 324 and the configuration rules 336. Specifically, the computing workload management model 330 can identify one or more configurations rules 336 to be applied based on a connection with the classification of the audio workload 324. In other words, the computing workload management computing module 320 can train the computing workload management model 330 to establish connections between the audio characteristics 332 and the configuration rules 336. Specifically, the computing workload management model 330 can identify one or more configurations rules 336 to be applied based on a connection with one or more of the audio characteristics 332 of the audio workload 324.

In some examples, the computing workload management computing module 320 can train the computing workload management model 330 using a machine learning process, and/or a neural network. For example, the computing workload management computing module 320 can identify the audio characteristics 332 over a first time period. The computing workload management computing module 320 can identify the audio characteristics 332 in response, or based on, execution (or prior to execution) of the audio workload 324 at the information handling system 304. That is, the computing workload management computing module 320 can identify the audio characteristics 332 of the audio workload 324 in response to execution of the audio workload 324 at the information handling system 304, or prior to execution of the audio workload 324 at the information handling system 304. The computing workload management computing module 320 can then train the computing workload management model 330 based on the audio characteristics 332, the classification of the audio workload 324 based on such audio characteristics 332, and the execution (or prior to execution) of the audio workload 324 (e.g., using a machine learning process, and/or a neural network).

In some examples, the configuration rules 336 can include rules for automatically adjusting one or more of the parameters 335 of the information handling system 304. The parameters 335 can include performance parameters, power parameters, acoustic parameters, and/or power efficiency parameters of the information handling system 304 For examples, the parameters 335 can include a central processing unit (CPU) frequency, a graphical processing unit (GPU) frequency, background application throttling, dynamic user-selectable thermal tables, processor power management core parking, and CPU thermal controls. That is, the configuration rules 336 can include rules for automatically adjusting the CPU frequency, the GPU frequency, the background application throttling, the dynamic user-selectable thermal tables, the processor power management core parking, and the time coordinated computing offset.

In some examples, the parameters 335 can include a dynamic EPO (energy performance optimizer) at runtime through a software OEM (original equipment manufacturer) variable. In some examples, the parameters 335 can include a CPU and a GPU clock control for performance management through Intel® Innovation Platform Framework (IPF). In some examples, the parameters 335 can include a dynamic user-selectable thermal tables (USTT). In some examples, the parameters 335 include dynamic control of background application resources. In some examples, the parameters 335 include resource de-prioritization of background tasks. In some examples, the parameters 335 include CPU thermal controls. In some examples, the parameters 335 include CPU hot plugging.

In some examples, the computing workload management computing module 320 can train the computing workload management model 330, based on processing of the audio stream classification of the audio workload 324, including generating the configuration policy 334 to include the configuration rules 336 for automatically increasing a speed of the fan 321 of the information handling system 304 and increasing a processing capability of the information handling system 304. For example, when the audio workload 324 is classified as an audio stream to be processed, the computing workload management model 320 can generate the configuration rules 336 to automatically increase the speed of the fan 321 (as acoustic noise generated by the fan 321 increases with an increased speed of the fan 321) and increase the processing capability of the information handling system 304 (e.g., processing capability of the processor subsystem 120, the memory subsystem 130, the I/O subsystem 140, the local storage resource 150, and the network interface 160). For example, the processing capability can include operations per second performed by the information handling system 304 (the processor subsystem 120), a data store rate of the information handling system 304 (local storage resource 150), or other operations performed by the information handling system 304. As the processing capability of the information handling system 304 is increased, a corresponding cooling requirement of the information handling system 304 is increased, and ultimately an increase in the speed of the fan 321 to achieve such increased cooling requirement of the information handling system 204. In some examples, the computing workload management computing module 320 can train the computing workload management model 330, based on processing of the audio stream classification of the audio workload 324, including generating the configuration policy 334 to include the configuration rules 336 for automatically increasing a speed of the fan 321 of the information handling system 304 and increasing a processing capability of the information handling system 304 while maintaining a synchronization of the audio stream to an corresponding video stream.

In some examples, the computing workload management computing module 320 can train the computing workload management model 330, based on recording of the audio stream classification of the audio workload 324, including generating the configuration policy 334 to include the configuration rules 336 for automatically decreasing a speed of the fan 321 of the information handling system 304 and decreasing a processing capability of the information handling system 304 (to a predetermined level). That is, the processing capability of the information handling system 304 can be reduced to a predetermined level while maintaining a minimum processing capability of the information handling system 304 to ensure appropriate recording of the audio stream.

For example, when the audio workload 324 is classified as an audio stream to be recorded, the computing workload management model 320 can generate the configuration rules 336 to automatically decrease the speed of the fan 321 (as acoustic noise generated by the fan 321 decreases with a decrease of the speed of the fan 321) and decreasing the processing capability of the information handling system 304 (e.g., processing capability of the processor subsystem 120, the memory subsystem 130, the I/O subsystem 140, the local storage resource 150, and the network interface 160). For example, the processing capability can include operations per second performed by the information handling system 304 (the processor subsystem 120), a data store rate of the information handling system 304 (local storage resource 150), or other operations performed by the information handling system 304. As the processing capability of the information handling system 304 is decreased, a corresponding cooling requirement of the information handling system 304 is decreased, and ultimately a decrease in the speed of the fan 321 to achieve such decreased cooling requirement of the information handling system 304.

The computing workload management computing module 320 can perform, at a second time, the steady-state management of the computing workloads at the information handling system 304. For example, the computing workload management computing module 320 monitors execution of an additional audio workload 354 at the information handling system 304. In some examples, monitoring the execution of the additional audio workload 354 can include identifying one or more audio characteristics 352 of the additional audio workload 354 executed at the information handling system 304, similar to that mentioned with identifying the audio characteristic 332 of the audio workload 324. For example, the audio characteristics 352 of the additional audio workload 354 can include a type of the audio workload 324, processing computing resources required by the audio workload 324, system inputs/outputs accessed by the audio workload 324, resource requirements of the audio workload 324, among other characteristics.

In some examples, the computing workload management computing module 320 can perform, based on the audio characteristics 352 of the additional audio workload 354, a classification of the additional audio workload 354 executing at the information handling system 304, similar to the classification of the audio workload 324. For example, the computing workload management computing module 320 can place the additional audio workload 354 into a class of workloads based on the audio characteristics 352 of the additional audio workload 354. For example, the computing workload management computing module 320 can classify the additional audio workload 354 based on, one or more of and among other characteristics, a type of the additional audio workload 354, processing computing resources required by the additional audio workload 354, system inputs/outputs accessed by the additional audio workload 354, resource requirements of the additional audio workload 354, among other characteristics.

The computing workload management computing module 320, in response to execution of the additional audio workload 354 at the information handling system 304, can access the computing workload management model 330 including the configuration policy 334. The computing workload management computing module 320 can further identify one or more of the configuration rules 336 based on the monitored execution of the additional audio workload 354. Furthermore, the computing workload management computing module 320 can apply the configuration rules 336 to the information handling system 304. In other words, the computing workload management computing module 320 can apply appropriate configuration rules 336 based on the monitored execution of the additional audio workload 354 as provided by the computing workload management model 330. In some examples, the computing workload management computing module 320 can apply the configuration rules 336 to perform computer-implemented actions to adjust one or more of the parameters 335.

In some examples, the computing workload management computing module 320 can perform the steady-state management of the audio computing workloads at the information handling system 304 iteratively.

In some examples, the computing workload management computing module 320, in response to execution of the additional audio workload 354 at the information handling system 304, can access the computing workload management model 330 including the configuration policy 334. The computing workload management computing module 320 can further identify one or more of the configuration rules 336 based on the classification of the additional audio workload 354. Furthermore, the computing workload management computing module 320 can apply the configuration rules 336 to the information handling system 304. In other words, the computing workload management computing module 320 can apply appropriate configuration rules 336 based on the classification of the additional audio workload 354 as provided by the computing workload management model 330. In some examples, the computing workload management computing module 320 can apply the configuration rules 336 to perform computer-implemented actions to adjust one or more of the parameters 335.

For example, the computing workload management computing module 320 can apply the configuration rules 336 to adjust one or more of the parameters 335 of the information handling system 304. For example, the computing workload management computing module 320 can apply the configuration rules 336 to adjust performance parameters, power parameters, acoustic parameters, and/or power efficiency parameters of the information handling system 304. For example, the computing workload management computing module 320 can apply the configuration rules 336 to adjust one or more of the CPU frequency, the GPU frequency, the background application throttling, the dynamic user-selectable thermal tables, the processor power management core parking, and the time coordinated computing offset. That is, the configuration rules 336 can include rules for automatically adjusting the CPU frequency, the GPU frequency, the background application throttling, the dynamic user-selectable thermal tables, the processor power management core parking, and the time coordinated computing offset.

For example, the computing workload management computing module 320 can apply the configuration rules 336 to adjust one or more of the parameters 335 such that an acoustic noise generated by one or more components of the information handling system 304 is reduced. For example, the computing workload management computing module 320 can apply the configuration rules 336 to adjust one or more of the parameters 335 such that a processing capability of the information handling system is increased. For example, the processing capability can include operations per second performed by the information handling system 304 (the processor subsystem 120), a data store rate of the information handling system 304 (local storage resource 150), or other operations performed by the information handling system 304.

In some examples, the computing workload management computing module 320 can perform classification of the additional audio workload 354, based on the audio characteristics 352 of the additional audio workload 344, as processing of an audio stream. The computing workload management computing module 320, in response to execution of the additional audio workload 354 at the information handling system 304, can access the computing workload management model 330 including the configuration policy 334. The computing workload management computing module 320 can further identify one or more of the configuration rules 336 based on the classification of the additional audio workload 354 as processing of an audio stream. Furthermore, the computing workload management computing module 320 can apply the configuration rules 336 to the information handling system 304. Specifically, the computing workload management computing module 320 can identify the connection between the classification of the additional audio workload 354 and the configuration rules 336 to identify the configuration rule 336 for automatically increasing a speed of the fan 321 of the information handling system 304 and increasing a processing capability of the information handling system 204. For example, when the additional audio workload 344 is classified as an audio stream to be processed, the computing workload management model 320 can identify a configuration rule 336 connected to such classification to automatically increase the speed of the fan 321 (as acoustic noise generated by the fan 321 increases with an increased speed of the fan 321) and increase the processing capability of the information handling system 304 (e.g., processing capability of the processor subsystem 120, the memory subsystem 130, the I/O subsystem 140, the local storage resource 150, and the network interface 160). As the processing capability of the information handling system 304 is increased, a corresponding cooling requirement of the information handling system 304 is increased, and ultimately an increase in the speed of the fan 321 to achieve such increased cooling requirement of the information handling system 304.

In some examples, the computing workload management computing module 320 can perform classification of the additional audio workload 354, based on the audio characteristics 352 of the additional audio workload 354, as recording of an audio stream. The computing workload management computing module 320, in response to execution of the additional audio workload 354 at the information handling system 304, can access the computing workload management model 330 including the configuration policy 334. The computing workload management computing module 320 can further identify one or more of the configuration rules 336 based on the classification of the additional audio workload 354 as recording of an audio stream. Furthermore, the computing workload management computing module 320 can apply the configuration rules 336 to the information handling system 304. Specifically, the computing workload management computing module 320 can identify the connection between the classification of the additional audio workload 354 and the configuration rules 336 to identify the configuration rules 336 for automatically decreasing a speed of the fan 321 of the information handling system 304 and decreasing a processing capability of the information handling system 304. For example, when the additional audio workload 354 is classified as an audio stream to be recorded, the computing workload management model 320 can identify the configuration rules 336 connected to such classification to automatically decrease the speed of the fan 321 (as acoustic noise generated by the fan 321 increases with an increased speed of the fan 321) and decrease the processing capability of the information handling system 304 (e.g., processing capability of the processor subsystem 120, the memory subsystem 130, the I/O subsystem 140, the local storage resource 150, and the network interface 160). As the processing capability of the information handling system 304 is decreased, a corresponding cooling requirement of the information handling system 304 is decreased, and ultimately a decrease in the speed of the fan 321 to achieve such increased cooling requirement of the information handling system 304.

Figure 4:
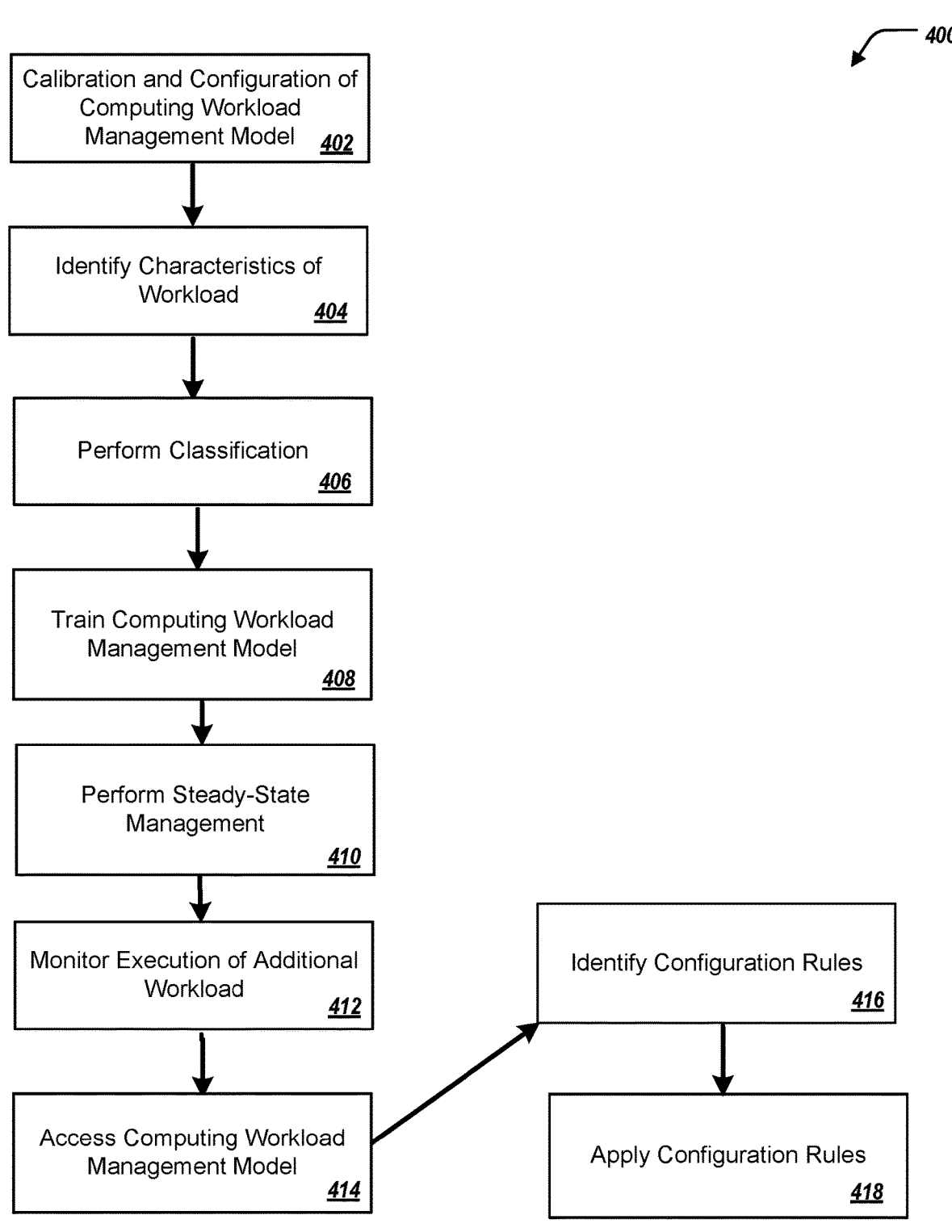
FIGS. 4, 5 illustrate respective methods for managing computing workloads.

FIG. 4 illustrates a flowchart depicting selected elements of an embodiment of a method 400 for managing computing workloads at an information handling system. The method 400 may be performed by the information handling system 100, the information handling system 204, the information handling system 304, the computing workload management computing module 220, and/or the computing workload management computing module 320, and with reference to FIGS. 1-3. It is noted that certain operations described in method 400 may be optional or may be rearranged in different embodiments.

The computing workload management computing module 220 can perform, at a first time, a calibration and configuration of the computing workload management model 230 (402). The computing workload management computing module 220 can identify characteristics 232 of the workload 224 executing at the information handling system 204 (404). The computing workload management computing module 220 can perform a classification of the workload 224 (406). The computing workload management computing module 220 can train, based on the classification of the workload 224, the computing workload management model 230 (408). In some examples, the computing workload management computing module 220 can generate, based on the classification of the workload 224, the configuration policy 234 that includes the configuration rules 236. In some examples, the configuration rules 236 are rules for performing computer-implemented actions for adjusting one or more parameters 235 of the information handling system 204. The computing workload management computing module 220 can perform, at a second time, the steady-state management of the computing workloads at the information handling system 204 (410). The computing workload management computing module 220 can monitor execution of the additional workload 254 at the information handling system 204 (412). The computing workload management computing module 220 can, in response to execution of the additional workload 254, access the computing workload management model 230 including the configuration policy 214 (414). The computing workload management computing module 220 can further identify one or more of the configuration rules 236 based on the monitored execution of the additional workload 254 (416). The computing workload management computing module 220 can apply the configuration rule 252 to perform computer-implemented actions to automatically adjust one or more parameters 235 of the information handling system 204 (418).

Figure 5:
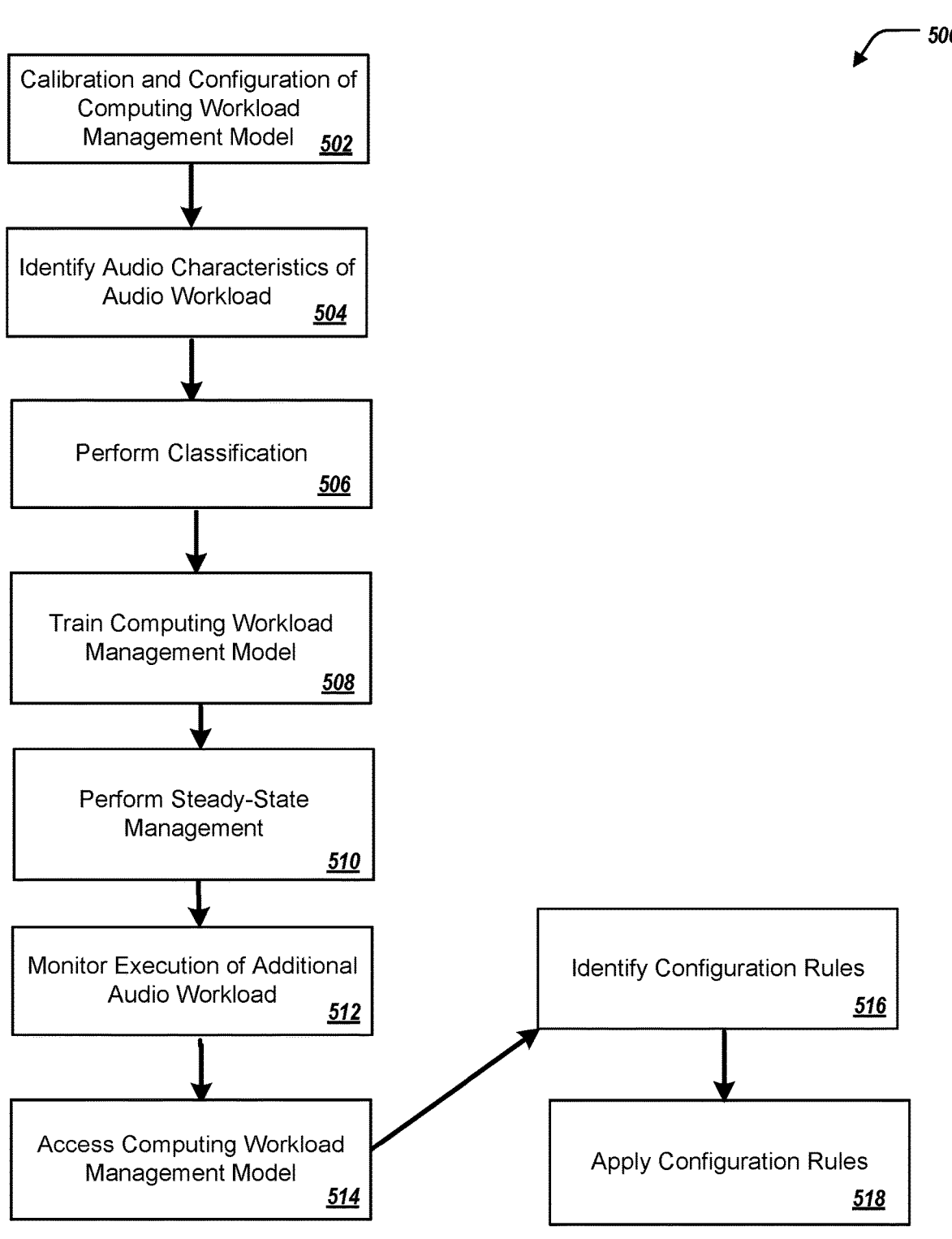

FIG. 5 illustrates a flowchart depicting selected elements of an embodiment of a method 500 for managing computing workloads at an information handling system. The method 500 may be performed by the information handling system 100, the information handling system 204, the information handling system 304, the computing workload management computing module 220, and/or the computing workload management computing module 320, and with reference to FIGS. 1-3. It is noted that certain operations described in method 500 may be optional or may be rearranged in different embodiments.

The computing workload management computing module 320 can perform, at a first time, a calibration and configuration of the computing workload management model 330 (502). The computing workload management computing module 320 can identify audio characteristics 332 of the audio workload 324 executing at the information handling system 304 (504). The computing workload management computing module 320 can perform a classification of the audio workload 324 (506). The computing workload management computing module 320 can train, based on the classification of the audio workload 324, the computing workload management model 330 (508). In some examples, the computing workload management computing module 320 can generate, based on the classification of the audio workload 324, the configuration policy 334 that includes the configuration rules 336. In some examples, the configuration rules 336 are rules for performing computer-implemented actions for adjusting one or more performance parameters of the information handling system 304. In some examples, the configuration rules 336 are rules for performing computer-implemented actions for adjusting a fan speed of the fan 321 and/or adjusting a processing capability of the information handling system 304. The computing workload management computing module 320 can perform, at a second time, the steady-state management of the computing workloads at the information handling system 304 (510). The computing workload management computing module 320 can monitor execution of the additional audio workload 354 at the information handling system 304 (512). The computing workload management computing module 420 can, in response to execution of the additional audio workload 354, access the computing workload management model 330 including the configuration policy 314 (514). The computing workload management computing module 320 can further identify one or more of the configuration rules 336 based on the monitored execution of the additional audio workload 354 (516). The computing workload management computing module 320 can apply the configuration rule 336 to perform computer-implemented actions to automatically adjust one or more performance parameters of the information handling system 304 (518). For example, the computing workload management computing module 320 can apply the configuration rule 336 to perform computer-implemented actions to automatically adjust the speed of the fan 321 and/or adjust a processing capability of the information handling system 304.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing computing workloads at an information handling system, comprising:

performing, at a first time, a calibration and configuration of a computing workload management model, including:

identifying one or more characteristics of a workload executing at the information handling system, the one or more characteristics including system inputs/outputs accessed by the workload;

performing, based on the one or more characteristics, a classification of the workload executing at the information handling system, including classifying the workload, based on the system inputs/outputs accessed by the workload, as processing of an audio stream;

training, based on the classification of the workload, the computing workload management model, including generating a configuration policy including configuration rules, the configuration rules for automatically adjusting one or more parameters of the information handling system, including increasing a speed of a fan of the information handling system and increasing a processing capability of the information handling system;

performing, at a second time, a steady-state management of the computing workloads at the information handling system, including:

monitoring execution of an additional workload at the information handling system, including identifying a system inputs/outputs accessed by the additional workload;

classifying the additional workload as processing of an audio stream based on the system inputs/output accessed by the additional workload;

in response to execution of the additional workload at the information handling system:

accessing the computing workload management model including the configuration policy;

identifying one or more of the configuration rules based on the monitored execution of the additional computing workload, including identifying the one or more configuration rules based on the classification of the additional workload as processing of an audio stream;

applying the one or more configuration rules to automatically adjust one or more parameters of the information handling system; and automatically increasing the speed of the fan of the information handling system and increasing the processing capability of the information handling system when the parameters of the information handling system are adjusted while maintaining synchronization of the audio stream to a corresponding video stream.

2. The computer-implemented method of claim 1, wherein adjusting the one or more parameters of the information handling system further includes adjusting the one or more parameters of the information handling system such that an acoustic noise of the information handling system is reduced.

3. The computer-implemented method of claim 1, wherein adjusting the one or more parameters of the information handling system further includes adjusting the one or more parameters of the information handling system such that a processing capability of the information handling system is increased.

4. The computer-implemented method of claim 1, wherein monitoring the execution of the additional workload further includes:

identifying one or more characteristics of the additional workload executing at the information handling system; and performing, based on the one or more characteristics, a classification of the additional workload executing at the information handling system, wherein the one or more of the configuration rules are identified based on the classification of the additional workload.

5. The computer-implemented method of claim 1, wherein performing the calibration and configuration of the computing workload management model further includes:

identifying audio characteristics of the workload executing at the information handling system;

performing, based on the audio characteristics, the classification of the workload as recording of an audio stream; and training, based on recording of the audio stream classification of the workload, the computing workload management model, including generating the configuration policy to include configuration rules for automatically reducing a speed of a fan of the information handling system and reducing a processing capability of the information handling system.

6. The computer-implemented method of claim 5, wherein performing the classification of the workload further includes classification of the workload as an incoming audio stream of a collaboration workload.

7. The computer-implemented method of claim 6, wherein the collaboration workload is a video-teleconferencing workload.

8. The computer implemented method of claim 1, wherein the one or more parameters includes one or more of a central processing unit (CPU) frequency, a graphical processing unit (GPU) frequency, background application throttling, dynamic user-selectable thermal tables, processor power management core parking, and thermal control circuit offset.

9. An information handling system comprising a processor having access to memory media storing instructions executable by the processor to perform operations, comprising:

performing, at a first time, a calibration and configuration of a computing workload management model, including:

identifying one or more characteristics of a workload executing at the information handling system, the one or more characteristics including system inputs/outputs accessed by the workload;

performing, based on the one or more characteristics, a classification of the workload executing at the information handling system, including classifying the workload, based on the system inputs/outputs accessed by the workload, as processing of an audio stream;

training, based on the classification of the workload, the computing workload management model, including generating a configuration policy including configuration rules, the configuration rules for automatically adjusting one or more parameters of the information handling system, including increasing a speed of a fan of the information handling system and increasing a processing capability of the information handling system;

performing, at a second time, a steady-state management of the computing workloads at the information handling system, including:

monitoring execution of an additional workload at the information handling system, including identifying a system inputs/outputs accessed by the additional workload;

classifying the additional workload as processing of an audio stream based on the system inputs/output accessed by the additional workload;

in response to execution of the additional workload at the information handling system:

accessing the computing workload management model including the configuration policy;

identifying one or more of the configuration rules based on the monitored execution of the additional computing workload, including identifying the one or more configuration rules based on the classification of the additional workload as processing of an audio stream;

applying the one or more configuration rules to automatically adjust one or more parameters of the information handling system; and automatically increasing the speed of the fan of the information handling system and increasing the processing capability of the information handling system when the parameters of the information handling system are adjusted while maintaining synchronization of the audio stream to a corresponding video stream.

10. The information handling system of claim 9, wherein adjusting the one or more parameters of the information handling system further includes adjusting the one or more parameters of the information handling system such that an acoustic noise of the information handling system is reduced.

11. The information handling system of claim 9, wherein adjusting the one or more parameters of the information handling system further includes adjusting the one or more parameters of the information handling system such that a processing capability of the information handling system is increased.

12. The information handling system of claim 9, wherein monitoring the execution of the additional workload further includes:

identifying one or more characteristics of the additional workload executing at the information handling system; and performing, based on the one or more characteristics, a classification of the additional workload executing at the information handling system, wherein the one or more of the configuration rules are identified based on the classification of the additional workload.

13. The information handling system of claim 9, wherein performing the calibration and configuration of the computing workload management model further includes:

identifying audio characteristics of the workload executing at the information handling system;

performing, based on the audio characteristics, the classification of the audio workload as recording of an audio stream; and training, based on recording of the audio stream classification of the audio workload, the computing workload management model, including generating the configuration policy to include configuration rules for automatically reducing a speed of a fan of the information handling system and reducing a processing capability of the information handling system.

14. The information handling system of claim 13, wherein performing the classification of the workload further includes classification of the workload as an incoming audio stream of a collaboration workload.

15. The information handling system of claim 14, wherein the collaboration workload is a video-teleconferencing workload.

16. A non-transitory computer-readable medium storing software comprising instructions executable by one or more computers which, upon such execution, cause the one or more computers to perform operations comprising:

performing, at a first time, a calibration and configuration of a computing workload management model, including:

identifying one or more characteristics of a workload executing at the information handling system, the one or more characteristics including system inputs/outputs accessed by the workload;

performing, based on the one or more characteristics, a classification of the workload executing at the information handling system, including classifying the workload, based on the system inputs/outputs accessed by the workload, as processing of an audio stream;

training, based on the classification of the workload, the computing workload management model, including generating a configuration policy including configuration rules, the configuration rules for automatically adjusting one or more parameters of the information handling system, including increasing a speed of a fan of the information handling system and increasing a processing capability of the information handling system;

performing, at a second time, a steady-state management of the computing workloads at the information handling system, including:

monitoring execution of an additional workload at the information handling system, including identifying a system inputs/outputs accessed by the additional workload;

classifying the additional workload as processing of an audio stream based on the system inputs/output accessed by the additional workload;

in response to execution of the additional workload at the information handling system:

accessing the computing workload management model including the configuration policy;

identifying one or more of the configuration rules based on the monitored execution of the additional computing workload, including identifying the one or more configuration rules based on the classification of the additional workload as processing of an audio stream;

applying the one or more configuration rules to automatically adjust one or more parameters of the information handling system; and automatically increasing the speed of the fan of the information handling system and increasing the processing capability of the information handling system when the parameters of the information handling system are adjusted while maintaining synchronization of the audio stream to a corresponding video stream.

\*  \*  \*  \*  \*